United States Patent
Feldman et al.

(10) Patent No.: US 10,683,242 B2
(45) Date of Patent: Jun. 16, 2020

(54) THIXOTROPIC SUSPENSION AGENT FOR PLANT NUTRIENTS OR ANIMAL FEED SUPPLEMENTS: COMPOSITION, METHOD OF MAKING, AND USE THEREOF

(71) Applicant: Active Minerals International LLC, Sparks, MD (US)

(72) Inventors: Steven B. Feldman, Sparks, MD (US); Jeffery Carr, Jr., Sparks, MD (US); Matthew J. Lyman, Sparks, MD (US); John Kitchens, Sparks, MD (US); Luke Fuhrmann, Sparks, MD (US); Robert J. Purcell, Jr., Sparks, MD (US); Dennis Parker, Sparks, MD (US)

(73) Assignee: Active Minerals International, LLC, Sparks, MD (US)

( * ) Notice: Subject to any disclaimer, the term of this patent is extended or adjusted under 35 U.S.C. 154(b) by 192 days.

(21) Appl. No.: 15/749,278

(22) PCT Filed: Aug. 4, 2016

(86) PCT No.: PCT/US2016/045563
§ 371 (c)(1),
(2) Date: Jan. 31, 2018

(87) PCT Pub. No.: WO2017/039943
PCT Pub. Date: Mar. 9, 2017

(65) Prior Publication Data
US 2019/0023623 A1    Jan. 24, 2019

Related U.S. Application Data

(60) Provisional application No. 62/211,410, filed on Aug. 28, 2015.

(51) Int. Cl.
*C05D 5/00*    (2006.01)
*C05B 9/00*    (2006.01)
(Continued)

(52) U.S. Cl.
CPC .............. *C05D 5/00* (2013.01); *A01C 21/005* (2013.01); *C05B 9/00* (2013.01); *C05F 11/02* (2013.01);
(Continued)

(58) Field of Classification Search
CPC .......... C05D 5/00; C05D 9/02; A01C 21/005; C05B 9/00; C05G 3/0064; C05G 1/00; C05F 11/02
See application file for complete search history.

(56) References Cited

U.S. PATENT DOCUMENTS

| | | | |
|---|---|---|---|
| 4,954,155 A | 9/1990 | Elrod et al. | |
| 2007/0119221 A1 | 5/2007 | Wolford | |
| 2014/0119841 A1* | 5/2014 | Purcell, Jr. | C04B 28/02 406/47 |

FOREIGN PATENT DOCUMENTS

CN    104829320    8/2015

OTHER PUBLICATIONS

BASF. "Attagel Rheology modifiers". <http://www.toshin-kasei.co.jp/basf%20attapulgite.pdf> Aug. 28, 2016.*
(Continued)

*Primary Examiner* — Jennifer A Smith
(74) *Attorney, Agent, or Firm* — Pilloff Passino & Cosenza LLP; Sean A. Passino; Rachel K. Pilloff

(57) ABSTRACT

A composition, in the form of an aqueous suspension. The composition comprises at least one form of attapulgite present in a solid weight fraction (SWF) amount ranging from 0.065% to 0.30%. The composition comprises kaolin present in a percent solids by weight (w/w %) amount ranging from 0.80% to 2.80%. The composition comprises one or more main plant nutrients or major animal mineral nutrient supplements. In the composition, the total percent solids by weight (w/w %) amount in the composition ranges from 45% to 90%. Although usable for other purposes, the
(Continued)

Stability Series - Suspensions composition is usable as a fertilizer. Although makeable in other ways, the composition is makeable by mixing the ingredients with agitation sufficient enough to form an aqueous suspension.

20 Claims, 9 Drawing Sheets

(51) Int. Cl.
*C05G 1/00* (2006.01)
*C05F 11/02* (2006.01)
*C05G 5/20* (2020.01)
*A01C 21/00* (2006.01)
*C05D 9/02* (2006.01)

(52) U.S. Cl.
CPC ............... *C05G 1/00* (2013.01); *C05G 5/20* (2020.02); *C05D 9/02* (2013.01)

(56) References Cited

OTHER PUBLICATIONS

USDA. "Attapulgite Handling/Processing". <https://www.ams.usda.gov/sites/default/files/media/Attapulgite%20TR.pdf> Feb. 21, 2017.*
International Search Report and Written Opinion for corresponding International PCT Application No. PCT/US2016/045563, dated Nov. 18, 2016, pp. 1-17.
Examination Report in AU Application No. 2016317298, dated Jun. 4, 2018.
Examination Report in NZ Application No. 739020, dated Jun. 22, 2018.
Search Report in TW Application No. 105125516, dated Mar. 17, 2017.
Examination Decision of Allowing a Patent in TW Application No. 105125516, dated Aug. 2, 2018.
Examination Notice in TW Application No. 105125516, dated Nov. 13, 2017.

* cited by examiner

US 10,683,242 B2

THIXOTROPIC SUSPENSION AGENT FOR PLANT NUTRIENTS OR ANIMAL FEED SUPPLEMENTS: COMPOSITION, METHOD OF MAKING, AND USE THEREOF

FIELD

A composition, in the form of an aqueous suspension, comprising at least one form of attapulgite present in a solid weight fraction (SWF) amount ranging from 0.065% to 0.21%; kaolin present in a percent solids by weight (w/w %) amount ranging from 0.80% to 2.80%; one or more main plant nutrients or animal nutrients; and water; wherein the total percent solids by weight (w/w %) amount in the composition ranges from 45% to 90%. Although subject to other uses, in some embodiments, the composition is suitable to produce a stable suspension fertilizer. Although makeable by multiple methods, in some embodiments, the composition is made by dispersing the one or more essential plant nutrients or animal nutrients in the aqueous liquid in the presence of the at least one form of attapulgite and kaolin.

INTRODUCTION

One disadvantage of liquid fertilizer supplements is the limited solubility of their various components and their tendency to salt out, or precipitate—whether by temperature change or liquid evaporation—making the it difficult to prepare stable, highly concentrated products that can be transported and applied to the field without significant settling and hard-packing.

It is to be understood that both the foregoing general description and the following detailed description are representative and explanatory only and are not restrictive of the invention, as claimed.

The accompanying drawings, which are incorporated in and constitute a part of this specification, illustrate embodiments of the invention and together with the description, serve to explain the principles of the invention.

BRIEF DESCRIPTION OF THE DRAWINGS

Each of FIGS. 1A-C is a bar chart of suspension parameters of fertilizer formulations having a grade 0-0-30 (A), 0-0-45 (B), and 0-0-50 (C).

Each of FIGS. 2A-C is a shear stress (Pa) v. time(s) plot of a fertilizer formulation having a grade 0-0-30 (A), 0-0-45 (B), and 0-0-50 (C).

Figure 4A:
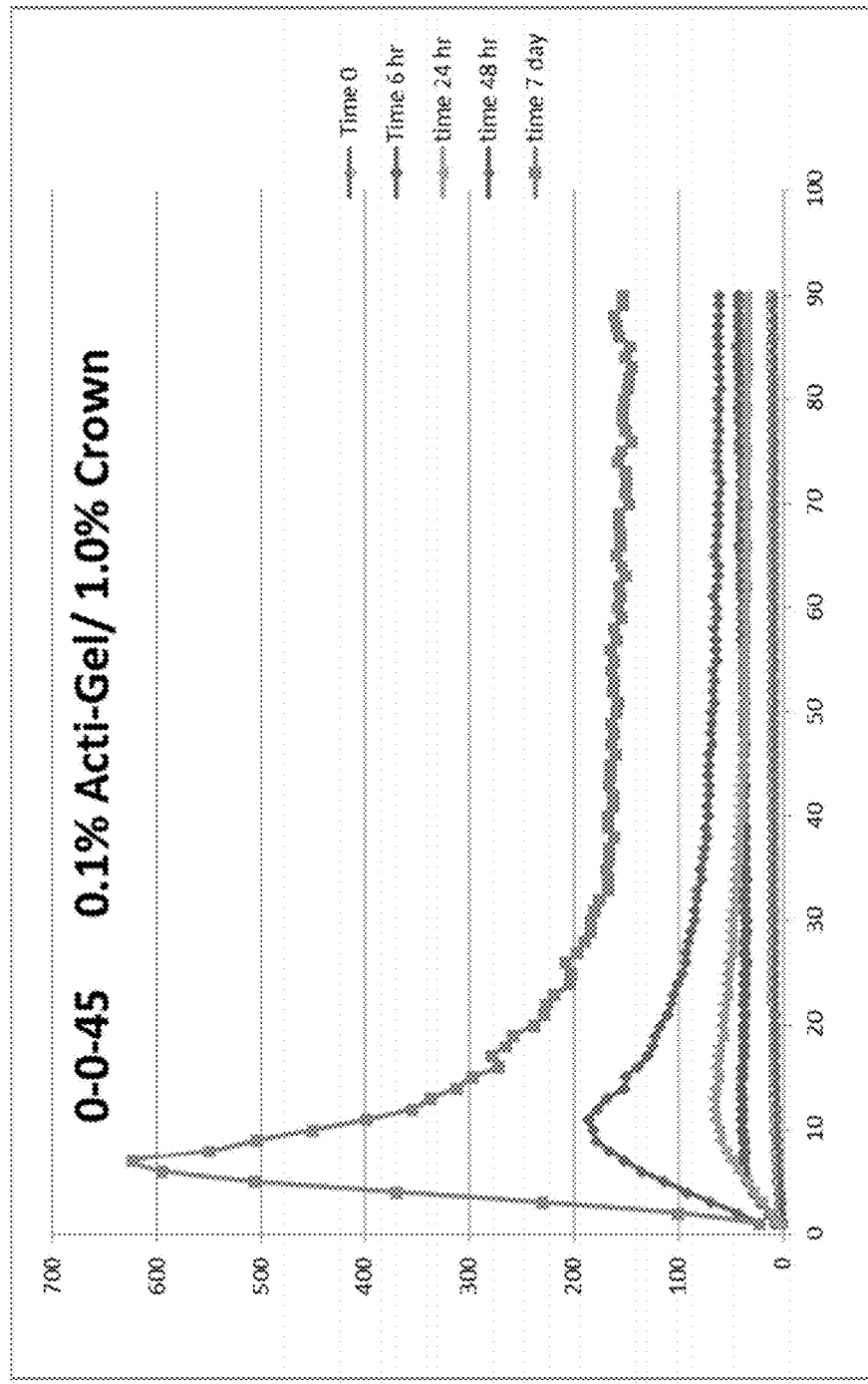
Figure 4B:
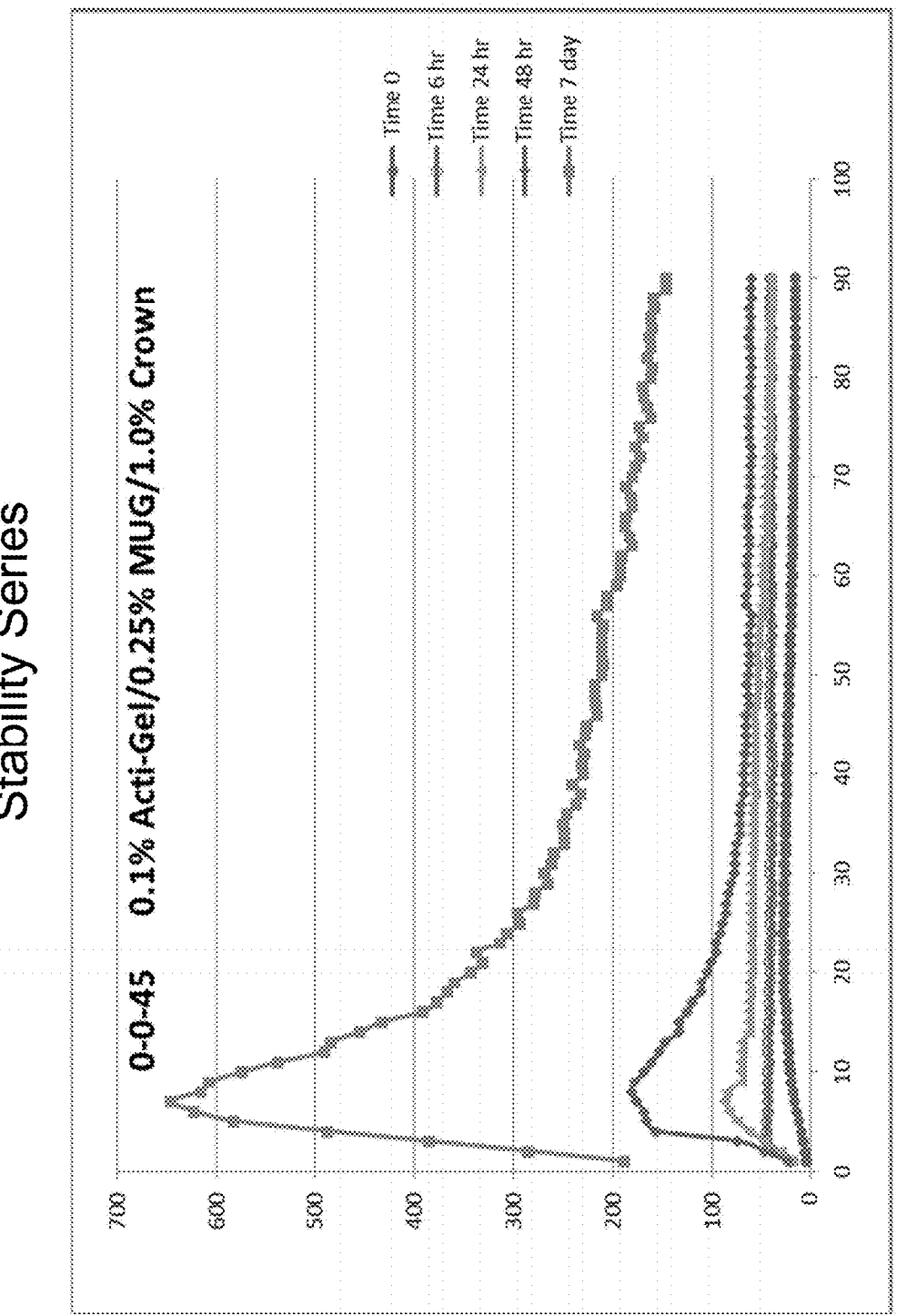

Each of FIGS. 4A-B is a shear stress (Pa) v. time(s) plot for a fertilizer formulation over seven days.

DESCRIPTION OF THE EMBODIMENTS

Reference will now be made in detail to the embodiments of the invention, examples of which are illustrated in the accompanying drawings.

The percent solids by weight (w/w %) is the weight of dry solids in a given volume of suspension, divided by the total weight of that volume of suspension, multiplied by 100%. w/w % is calculated using the following formula:

$$w/w\ \% = W_s/W_t \times 100\% \tag{1}$$

in which $W_s$ is the weight of dry solids in a suspension, and $W_t$ is the total weight of the suspension. For example, if the total weight of solids ($W_s$) in a suspension is 75 g, and the total weight of the suspension is 100 g, then the percent solids by weight w/w % is 75%.

The percent solid weight fraction of an ingredient of a suspension (SWF$_i$ %) is the weight of the dry solid ingredient in a given volume of suspension, divided by the total dry weight of all solids in that volume of suspension, multiplied by 100%.

$$\text{SWF}_i\ \% = W_{s,i}/W_s \times 100\% \tag{2}$$

in which in which $W_{s,i}$ is the weight of the dry solid ingredient in a suspension. For example, if the total weight of solids ($W_s$) in a suspension is 100 g, and 2.0 g of which is ActiGel® ($W_{s,i}$), then for ActiGel®, SMF$_{ActiGel®}$ %=2.0%.

The percent solids by volume (v/v %) is the actual volume of the solid material in a given volume of suspension, divided by the given volume of suspension, multiplied by 100%. v/v % is calculated using the following formula:

$$v/v\ \% = V_s/V_t \times 100\% \tag{3}$$

in which $V_s$ is the volume of the solid material, and $V_t$ is the volume of the suspension. For example, if the volume of solids ($V_s$) in a suspension is 60 mL, and the total volume of the suspension is 100 mL, then the percent solids by volume v/v % is 60%.

A combination of the at least one form of attapulgite and kaolin, in some embodiments, is a blended thixotropic suspension agent capable of maintaining solid particles or coarse crystals, such as potassium chloride (KCl), in concentrations of up to 75% w/w (45% v/v) in a supersaturated aqueous solution without continuous agitation to maintain homogeneity. Applications of the blended thixotropic suspension include foliar plant fertilizers and similar materials. Applications of the blended thixotropic suspension further include pet foods, animal feeds, and supplements thereof.

As known to the inventors, earlier fertilizers use from 1.7%-5% attapulgite as a suspension/gelling agent. These suspension/gelling agents are surpassed, in some embodiments, by the present blended thixotropic suspension agent, which demonstrates a higher range of improvements in solids content, crystallite stabilization, or pourability/sprayability. In some embodiments, the composition provides better functionality in terms of suspension that make it possible to achieve (1) higher analysis grade (solids carrying capacity, or concentration) per unit volume than indicated to date, (2) improved stability (suspension) and pourability characteristics, or (3) improved cost benefits resulting from, in part, reduced material freight costs than conventional 'attapulgite-alone' systems.

A composition, in the form of an aqueous suspension, comprises at least one form of attapulgite present in a solid weight fraction (SWF) amount ranging from 0.065% to 0.30%; kaolin present in a percent solids by weight (w/w %) amount ranging from 0.80% to 2.80%; one or more main plant nutrients or major animal mineral nutrient supplements; and water. The total percent solids by weight (w/w %) amount in the composition ranges from 45% to 90%.

In some embodiments, the at least one form of attapulgite is present in an amount SWF ranging from 0.075% to 0.21% or from 0.090% to 0.18% or from 0.10% to 0.15%.

In some embodiments, the at least one form of attapulgite from a locality chosen from Palygorskaya, near the Popovka River, Perm, Russia; Attapulgus, Decatur Co., Georgia; at Tafraout, Morocco; and in the Hyderabad deposit, Andhra Pradesh, India. In some embodiments, the attapulgite is from Attapulgus, Decatur Co., Georgia. In some embodiments, the attapulgite is associated with other non-attapulgite minerals, such as montmorillonite, dolomite, calcite, talc, chlorite, quartz, and the like. In some embodiments, the attapulgite is substantially free of non-attapulgite minerals. Such purified attapulgite is, in some embodiments, available by using the methods in U.S. Pat. Nos. 6,444,601 and 6,130,179, each of which is incorporated herein in its entirety.

In some embodiments, the attapulgite is a purified hydrous magnesium alumino silicate.

In some embodiments, the at least one form of attapulgite is chosen from attapulgites impoverished in smectite. Such impoverishment, in some embodiments, is obtained by dry processing. In some embodiments, the at least one form of attapulgite is from a dry-processed, finely-pulverized, gelling grade of bulk Mg-aluminosilicate clay chosen from the fuller's earth deposits in the Meigs-Quincy district near Attapulgus, Ga. For example, in some embodiments, the dry-processed attapulgite has not been purified for removal of smectite.

In some embodiments, the dry processed attapulgite is chosen from MIN-U-GEL® 200, MIN-U-GEL® 400, MIN-U-GEL® 500, MIN-U-GEL® PC, MIN-U-GEL® FG, MIN-U-GEL® AR, MIN-U-GEL® G35, FLORIGEL®, FLORIGEL® HY, and MIN-U-GEL® MB. Each is available from Active Minerals International.

Attapulgite is sometimes referred to as salt gel or fuller's earth. In some embodiments, attapulgite is a hydrous magnesium aluminum-silicate produced in gel and absorbent grades.

In some embodiments, the attapulgite is MIN-U-GEL® or Florigel®.

In some embodiments, the one or more forms of attapulgite is MIN-U-GEL® and ACTI-GEL 208®.

In some embodiments, the kaolin is present in a in a percent solids by weight (w/w %) amount ranging from 0.90% to 2.6% or from 1.10% to 2.5% or from 0.95% to 2.3% or from 1.05% to 2.0%.

In some embodiments, kaolin clay is an inert hydrous aluminum silicate clay with a low shrink-swell capacity, low cation-exchange capacity, and minimal grit content. In some embodiments, the kaolin is chosen from those in which less than or equal to 0.25 wt % of the material has a size greater than 47 μm or less than or equal to 0.12 wt % of the material has a size greater than 47 μm.

In some embodiments, the kaolin clay is obtained from Active Minerals International ActiMin® line of air-floated kaolin clays, or another air float kaolin clay.

In some embodiments, the kaolin clay is chosen from hard and soft clays. In some embodiments, the soft clay is an air float kaolin. In some embodiments, the hard clay is a reinforcement clay.

In some embodiments, the kaolin clay is chosen from ACTI-MIN® SA-1, ACTI-MIN® CR, ACTI-MIN® WC, ACTI-MIN® WC-5, ACTI-MIN® CAST, ACTI-MIN® RP-2, ACTI-MIN® RP-80, ACTI-MIN® SA-1, ACTI-MIN® CR, ACTI-MIN® FE, CHAMPION®, CROWN®, and WHITE CROWN®.

In some embodiments, the at least one form of attapulgite is chosen from purified attapulgites, such as those noted herein, and dry processed attapulgites, such as those noted herein.

In some embodiments, the composition further comprises at least one second form of attapulgite present in a percent solids by weight (w/w %) amount ranging from 0.13% to 0.37%. For example, the amount of the at least one second form of attapulgite ranges from 0.17% to 0.33% or from 0.20 to 0.30%.

In some embodiments, the at least one second form of attapulgite is chosen from dry processed attapulgites, such as those noted herein.

In some embodiments, the at least one form of attapulgite is chosen from purified attapulgites, such as those noted herein; and the at least on second form of attapulgite is chosen from dry processed attapulgites, such as those noted herein.

The one or more main plant nutrients are any combination of nitrogen, phosphorous, and potassium sufficient for fertilizers, e.g., foliar or side-dressed fertilizers. In some embodiments, the main plant nutrients are chosen from monofertilizers, such as N, P, K; binary fertilizers, such as N—P, N—K, P—K; and NPK fertilizers (N—P—K).

In some embodiments, the fertilizer has a grade in which the amount of nitrogen (N) ranges from 0 to 55 or from 5 to 35 or from 10 to 25.

In some embodiments, the fertilizer has a grade in which the amount of phosphate ($P_2O_5$) ranges from 10 to 60 or from 30 to 55 or from 40 to 50.

In some embodiments, the fertilizer has a grade in which the amount of $K_2O$ ranges from 20 to 50 or from 30 to 45 or from 35 to 40.

In some embodiments, the nitrogen is from a source chosen from ammonium salts, nitrate salts, ammonia, and urea. In some embodiments, the ammonium salts are chosen from nitrate, sulfate, phosphate, super-phosphates, and chlorides.

In some embodiments, the phosphorous is from a source chosen from phosphates, such as phosphate, monophosphates, diphosphates, orthophosphates, rock phosphates, superphosphates, or concentrated superphosphates. In some embodiments, the phosphates are chosen from diammonium phosphate, ammonium polyphosphate, monoammonium phosphate, and calcium superphosphate.

In some embodiments, the potassium is from a source chosen from potash, sulfates, nitrates, hydroxides, and sulfate of potash magnesia. In some embodiments, the potassium is from a source chosen from potassium chloride, potassium magnesium sulfate, potassium nitrate, and potassium sulfate.

The one or more major animal mineral nutrient supplements are sodium chloride, calcium, and phosphorus. In some embodiments, the one or more major animal mineral nutrient supplements are chosen from limestone, calcium phosphates, and pulverized fine salt (NaCl).

As used herein, a suspension is a liquid in which solid particles are dispersed.

In some embodiments of an aqueous suspension, the liquid is water. In some embodiments of an aqueous suspension, the liquid comprises water and at least one other liquid. In some embodiments of an aqueous suspension, the water is present in an amount greater than 50% v/v relative to the total volume of the water plus the volume of the at least one other liquid. In some embodiments, the amount is greater than 60% v/v or 70% v/v or 96% v/v or 99% v/v. In some embodiments, the amount ranges from 75% to 95% v/v or from 80% to 90% v/v.

Water is obtainable from many sources. Any water suitable for use as a fertilizer, pet food, or animal feed is usable in the composition. In some embodiments, the water is fresh water or distilled water. In some embodiments, the water is from a source chosen from lakes, ponds, rivers, and ground water.

Any at least one liquid suitable for use as a fertilizer, pet food, or animal feed is usable in the composition. In some embodiments, the at least one other liquid is an organic liquid. In some embodiments, the organic liquid is urea. In some embodiments, the at least one other liquid is an inorganic liquid. In some embodiments, the inorganic liquid is ammonia. In some embodiments, the at least one other liquid is miscible with water or at least partially miscible with water. In some embodiments, the at least one other liquid is added, e.g., by a processing step before, during, or after suspending solid particulates to form the composition.

In some embodiments, the aqueous phase of the liquid has a pH ranging from 4 to 8. In some embodiments, the pH ranges from 5 to 7 or from 5.5 to 6.5. In some embodiments, the pH is adjusted using a neutralizer.

In some embodiments, the neutralizer is chosen from lime, dolomite, iron sulfate, aluminum sulfate, and ammonium sulfate.

In some embodiments, at least one other solid substance is present in the aqueous liquid. In some embodiments, the at least one other solid substance is miscible in a component of the aqueous liquid phase, e.g., water. In some embodiments, the at least one other solid substance is immiscible in a component of the aqueous liquid phase. In some embodiments, the at least one other solid substance is in the source of water or is added in a process of gathering the solid particulates.

In some embodiments, the total percent solids by weight (w/w %) amount in the composition ranges from 47% to 85% or from 50% to 81% or from 68% to 78%. An aqueous suspension of the solid particulates is defined as from 45% to 90% by weight of solid particulates relative to the total weight of the water plus the dry weight of the solid particulates (% w/w). In some embodiments, the aqueous suspension of the solid particulates is present in an amount ranging from 47% to 85% w/w by weight of solid particulates relative to the total weight of the water plus the dry weight of the solid particulates. In some embodiments, the amount ranges from 50% to 81% w/w, 55% to 78% w/w or from 60% to 72% w/w.

The solid particles of the suspension are the solid particulates.

In some embodiments, the composition comprises one or more secondary plant nutrients. In some embodiments, the one or more secondary plant nutrients are chosen from calcium, magnesium, and sulfur. In some embodiments, the calcium is in the form chosen from a nitrate, sulfate, phosphates, and carbonates. In some embodiments, the magnesium is in the form chosen from carbonates and sulfates. In some embodiments, the sulfur is in the form chosen from sulfates, sulfuric acid, and elemental sulfur. In some embodiments, the calcium, magnesium, or sulfur is in a form of a mineral. In some embodiments, the one or more secondary plant nutrients are chosen from copper, iron, manganese, molybdenum, zinc, boron, silicon, cobalt, and vanadium.

In some embodiments, the composition comprises one or more minor or trace mineral nutrients, such as potassium, sulfur, magnesium, iron, iodine, copper, cobalt, zinc, manganese, boron, molybdenum, fluorine, and selenium. In some embodiments, the one or more minor or trace elements are chosen from trace mineral salt formulations and/or mineral premix blends.

In some embodiments, the composition comprises one or more water or fat soluble vitamins. In some embodiments, the one or more water or fat soluble vitamins are from fish oils, wheat oils, or cod liver oils. In some embodiments, the one or more water or fat soluble vitamins are chosen from Vitamin A, Vitamin D, Vitamin E, Vitamin K, and riboflavin.

In some embodiments, the composition comprises one or more additional energy nutrients chosen from proteins, carbohydrates, fats, vitamins, and nitrogen. In some embodiments, the one or more additional energy nutrients are chosen from amino acids, such as, arginine, lysine, methionine-cystine, tryptophan, phenylalanine-tyrosine, and taurine. In some embodiments, the one or more additional energy nutrients are chosen from fats, such as omega 3 fatty acids and omega 6 fatty acids. In some embodiments, the one or more additional energy nutrients are chosen from vitamins, such as Vitamin A, Vitamin D, Vitamin E, Vitamin K, and riboflavin. In some embodiments, the one or more additional energy nutrients are chosen from carbohydrates, such as plant material and dietary fiber.

In some embodiments, the composition comprises one or more additional energy nutrients chosen from soybean meal, cottonseed meal, corn gluten, and urea; high energy byproducts including molasses, fats/oils, soybean hulls, hominy, distiller's/brewers grains, fish/meat meal, dried milk or whey, corn gluten feed, corn gluten, brewer's/distiller's grains, and urea.

In some embodiments, the composition comprises one or more additional energy nutrients chosen from meats, meat by-products, poultry, poultry by-products, meat meals, meat and bone meals, animal by-product meals, poultry by-product meals, poultry meals.

In some embodiments, the composition further comprises a deflocculant. In some embodiments, the deflocculant is organic, such as humic acids and derivatives, alkaline lignosulfonates, tannin compounds, polyacrylates and acrylic derivatives, polycarbonates, sodium citrate, low viscosity socium carboxymethyl cellulose (Na-CMC), and gum arabic. In some embodiments, the deflocculant is inorganic, such as sodium silicates, sodium and ammonium oxalates, phosphates and polyphosphates, sodium and potassium hydroxides, and sodium and potassium carbonates. In some embodiments, the deflocculant is chosen from sodium silicate, tripolyphosphate pyrophosphate, tetraphosphate, and esametaphosphate. In some embodiments, the deflocculant is chosen from TSPP. In some embodiments, the composition is free of deflocculants.

In some embodiments, additives, other than those noted above, are added to the aqueous suspension. In some embodiments, additives are chosen from substances added for processing the solid particulates or water sources.

In some embodiments, the suspension is made by dispersing solid particles in the aqueous liquid through agitation in the presence of one or more forms of attapulgite and kaolin clay. In some embodiments, the agitation is in the presence of one or more additives. In some embodiments, the agitation is in the presence of two or more forms of attapulgite and a kaolin clay.

The aqueous liquid, solid particulates, and one or more forms of attapulgite and kaolin clay are mixed in any order. In some embodiments, the aqueous liquid, solid particulates, the one or more forms of attapulgite and kaolin clay, and/or optionally one or more additional additives (a neutralizer, the at least one other solid substance, and the others noted herein) are mixed in any order.

In some embodiments, both the aqueous liquid and solid particulates are added to the one or more forms of attapulgite and kaolin clay. In some embodiments, both the one or more forms of attapulgite and kaolin clay and the solid particulates are added to the aqueous liquid.

In some embodiments, agitation is sufficient to substantially homogenize the aqueous suspension. In some embodiments, the agitation is sufficient to homogenize the aqueous suspension. In some embodiments, the homogenization makes is possible for the solid particulates to settle in a manner inconsistent with that predicted by Stokes Law of settling.—e.g., under gravity with minimal particle-particle interaction.

In some embodiments, the aqueous suspension is an inhomogeneous aqueous suspension.

In some embodiments, the agitation is mechanical. In some embodiments, the agitation is chosen stirring, pumping, and milling. In some embodiments, the solid particulates are present in an amount sufficient to create shear forces on the aqueous liquid and to facilitate homogenization of the aqueous suspension. In some embodiments, agitation is the result of concrete drilling, ultrasound dispersing, or cavitation.

In some embodiments, the one or more forms of attapulgite is added in the form of a powder clay. In some embodiments, the powder clay is dry before the addition.

In some embodiments, the one or more forms of attapulgite is added in the form of a pre-gel consisting of the one or more forms of attapulgite and water. In some embodiments, the pre-gel consists of from 18% to 26% of the one or more forms of attapulgite by weight and the remainder water. In some embodiments, the water has a pH chosen from values already disclosed herein regarding the liquid phase of the aqueous suspension. In some embodiments, the water comprises at least one neutralizer chosen from those already disclosed herein regarding the liquid phase of the aqueous suspension.

In some embodiments, the mineral suspending agent is added in the form of a pre-dispersion consisting of the one or more forms of attapulgite, a kaolin clay, and water. In some embodiments, the pre-dispersion consists of from 1% to 30% solid weight fraction (SWF) of the one or more forms of attapulgite by weight, from 60 to 70% by weight of the kaolin clay, and the remainder water. In some embodiments, the water has a pH chosen from values already disclosed herein regarding the liquid phase of the aqueous suspension. In some embodiments, the water comprises at least one neutralizer chosen from those already disclosed herein regarding the liquid phase of the aqueous suspension.

For example, the method of making a composition, in the form of an aqueous suspension, comprises mixing water, at least one form of attapulgite, kaolin, and one or more main plant nutrients to form a mixture; and agitating the mixture to form the composition in the form of an aqueous suspension. In some embodiments, the mixing further comprises mixing a second form of attapulgite and the composition in the form of an aqueous suspension comprises at least one second form of attapulgite present in a percent solids by weight (w/w %) amount ranging from 0.13% to 0.37%.

These are exemplary methods of making, and any composition described herein is makeable by mixing the ingredients and agitating described herein.

In some embodiments, the storage is for a period is greater than 8 hours. In some embodiments, the storage is for a period ranging from 8 hours to 7 days. In some embodiments, the storage is for a period ranging from 3 to 6 days or from 4 to 5 days.

In some embodiments, the aqueous suspension is a non-settling slurry. A non-settling slurry is a homogeneous aqueous suspension which does not settle for 24 hours to 7 days.

The composition is utilizable as a fertilizer for plants. A method of fertilizing a plant, comprises applying a composition to a plant, wherein the composition, in the form of an aqueous suspension. In some embodiments, the composition is soil applied to roots of a plant. In some embodiments, the composition is spray applied to leaves of a plant.

Example 1

A purpose of this example is to make several formulations and determine their ability to form a suspension having a high solids content. The following 14 formulations shown in Table 1 were made.

TABLE 1

Examples 1-14

| Example | Grade | Shorthand | 20% AG Slurry | 28% MUG Slurry | Neat Crown | Neat Potash (KCl) | TSPP | Water | AG as % Solids | MUG as % total formula | Crown as % total formula | KCl Solids (w/w %) | K2O based on 99% KCl | Total Solids added (w/w %) | Total Solids added (v/v %) |
|---|---|---|---|---|---|---|---|---|---|---|---|---|---|---|---|
| 1 | 0-0-30 | 1.7% MUG (TSPP) | — | 40.0 | — | 325 | 0.65 | 302 | 0.00% | 1.7% | 0.0% | 48.7% | 30.2% | 50.44% | 36.3% |
| 2 | | 0.1% AG (TSPP) | 1.6 | — | — | 325 | 0.65 | 340 | 0.10% | 0.0% | 0.0% | 48.8% | 30.2% | 48.85% | 33.0% |
| 3 | | 0.1% AG | 1.6 | — | — | 325 | | 340 | 0.10% | 0.0% | 0.0% | 48.8% | 30.2% | 48.85% | 33.0% |
| 4 | | 0.2% AG/ 1.0% Crown | 3.3 | — | 6.7 | 325 | | 332 | 0.20% | 0.0% | 1.0% | 48.7% | 30.2% | 49.93% | 33.9% |
| 5 | | 0.2% AG/ 2.0% Crown | 3.3 | — | 13.3 | 325 | | 325 | 0.19% | 0.0% | 2.0% | 48.8% | 30.2% | 50.94% | 34.7% |
| 6 | 0-0-45 | 1.0% MUG (TSPP) | — | 23.8 | — | 488 | 0.38 | 155 | 0.00% | 1.0% | 0.0% | 73.2% | 45.4% | 74.21% | 62.1% |
| 7 | | 1.7% MUG (TSPP) | — | 40.0 | — | 488 | 0.65 | 138 | 0.00% | 1.7% | 0.0% | 73.3% | 45.4% | 74.99% | 65.0% |
| 8 | | 0.1% AG/ 1.0% Crown | 2.4 | — | 6.7 | 488 | | 170 | 0.10% | 0.0% | 1.0% | 73.2% | 45.4% | 74.25% | 59.9% |
| 9 | | 0.1% AG/ 2.0% Crown | 2.4 | — | 13.3 | 488 | | 163 | 0.10% | 0.0% | 2.0% | 73.2% | 45.4% | 75.29% | 61.2% |

TABLE 1-continued

Examples 1-14

| Example | Grade | Shorthand | 20% AG Slurry | 28% MUG Slurry | Neat Crown | Neat Potash (KCl) | TSPP | Water | AG as % Solids | MUG as % total formula | Crown as % total formula | KCl Solids (w/w %) | K2O based on 99% KCl | Total Solids added (w/w %) | Total Solids added (v/v %) |
|---|---|---|---|---|---|---|---|---|---|---|---|---|---|---|---|
| 10 |  | 0.2% AG/ 2.0% Crown | 4.9 | — | 13.3 | 488 |  | 161 | 0.20% | 0.0% | 2.0% | 73.1% | 45.3% | 75.33% | 61.5% |
| 11 |  | 0.1% AG/ 0.25% MUG/ 1.0% Crown (TSPP) | 2.4 | 6.0 | 6.7 | 488 | 0.095 | 164 | 0.10% | 0.25% | 1.0% | 73.2% | 45.4% | 75.51% | 61.1% |
| 12 | 0-0-50 | 0.1% AG/ 1.0% Crown (TSPP) | 2.7 | — | 6.7 | 542 | 0.65 | 115 | 0.10% | 0.0% | 1.0% | 81.3% | 50.4% | 82.44% | 71.0% |
| 13 |  | 0.1% AG/ 0.25% MUG/ 1.0% Crown | 2.7 | 6.0 | 6.7 | 542 |  | 110 | 0.10% | 0.3% | 1.0% | 81.2% | 50.4% | 82.57% | 72.0% |
| 14 |  | 1.7% MUG (TSPP) | — | 40.0 | — | 542 | 0.095 | 85 | 0.00% | 1.7% | 0.0% | 81.3% | 50.4% | 82.98% | 77.0% |

The potash source is CLUNETTE. AG is ActiGel 208 ®. MUG is MIN-U-GEL ®.

Examples 1-5 are fertilizer formulations having a grade 0-0-30. Examples 6-11 are fertilizer formulations having a grade 0-0-45. Examples 12-14 are fertilizer formulations having a grade 0-0-50.

In Table 1, the term "20% AG Slurry" represents the mass in grams of a pre-mix aqueous slurry of 20% by weight ActiGel 208®, a form of purified attapulgite. The term "28% MUG Slurry" represents the mass in grams of a pre-mix aqueous slurry of 28% by weight MIN-U-GEL®, a second form of attapulgite. The term "Neat Crown" represents the mass in grams of kaolin. The term "Neat Potash (KCl)" represents the mass in grams of the source of potassium (KCl). Here the potassium is in the form of KCl, and the potash source is clunette. The term "TSPP" represents the mass in grams of tetrasodium pyrophosphate. The term "Water" represents the mass in grams of water.

The term "AG as % Solids" represents the solid weight fraction (SWF %) amount of ActiGel 208® present in a given example. The term "MUG as % total formula" represents the percent solids by weight % (w/w %) amount of MIN-U-GEL® in a given example. The term "Crown as % total formula" represents the percent solids by weight % (w/w %) amount of kaolin in a given example. The term "KCl solids (w/w %)" represents the percent solids by weight % (w/w %) of potassium of a given example. The term "$K_2O$ based on 99% KCl" converts the potassium weight % to an equivalent for $K_2O$ for a given example. The term "Total Solids added (w/w %)" refers to the percent solids by weight % (w/w %) of solids in the formulation. The term "Total Solids added (v/v %)" refers to the percent solids by volume % (v/v %) of solids in the formulation.

Each ingredient was added in the amount shown in Table 1 and mixed by agitation sufficient to form a suspension if forming a suspension were possible. The ActiGel 208® and MIN-U-GEL® were added in the form of a pre-mix aqueous suspension as noted above. An aliquot of the example was added to a graduated cylinder to determine the example's ability to form a stable suspension in terms of syneresis, suspension, hard packing, and soft packing formation. Soft packed (settled) sediments are distinguished from materials held in suspension by their ability to stop a lightweight fiberglass rod from traversing the formulation in the cylinder under the force of gravity alone. Slight pressure (or additional weight) is required to penetrate a soft-packed layer, and firm to very firm pressure is needed for the rod to penetrate a hard-packed layer.

Figure 1A:
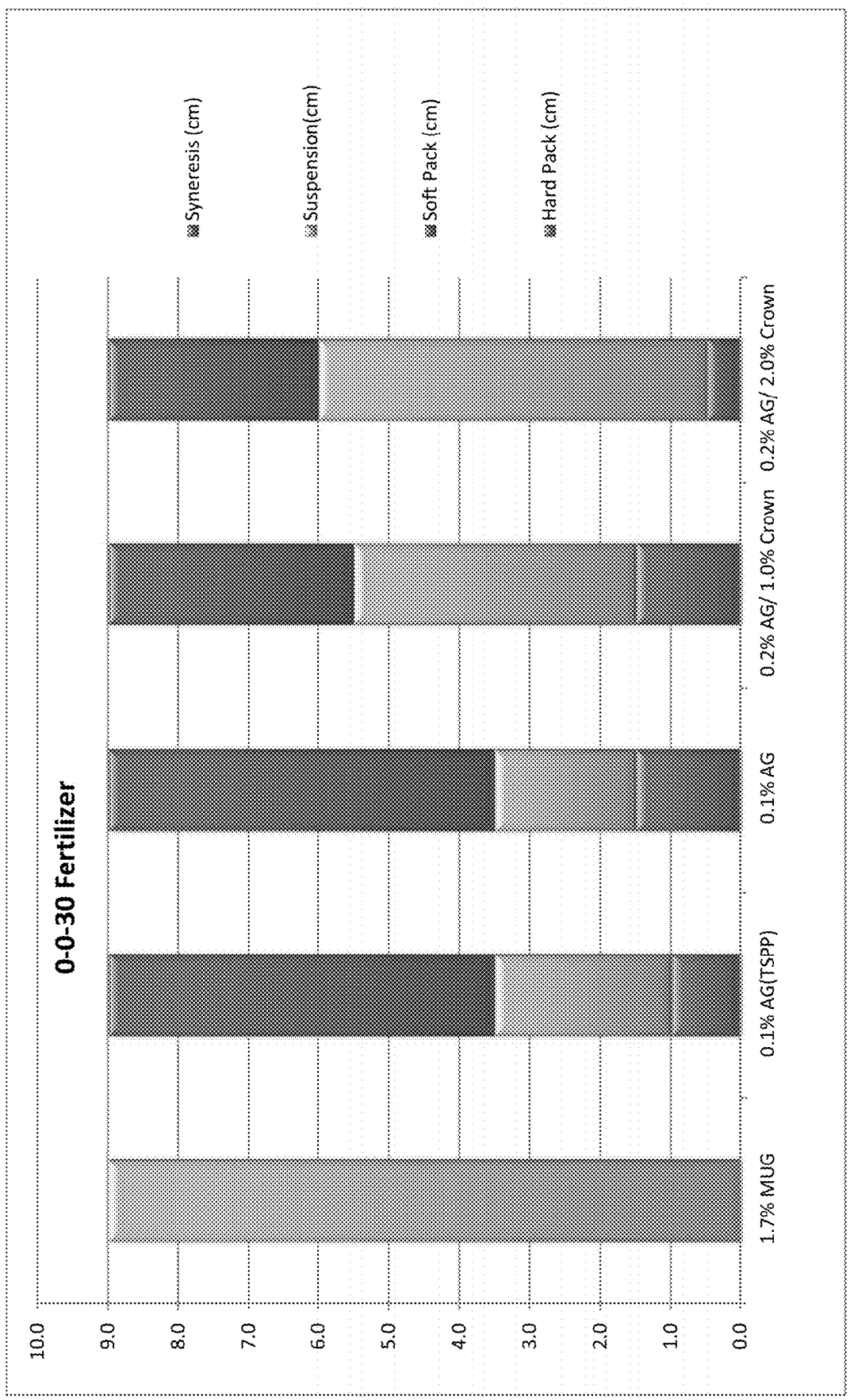
Figure 1B:
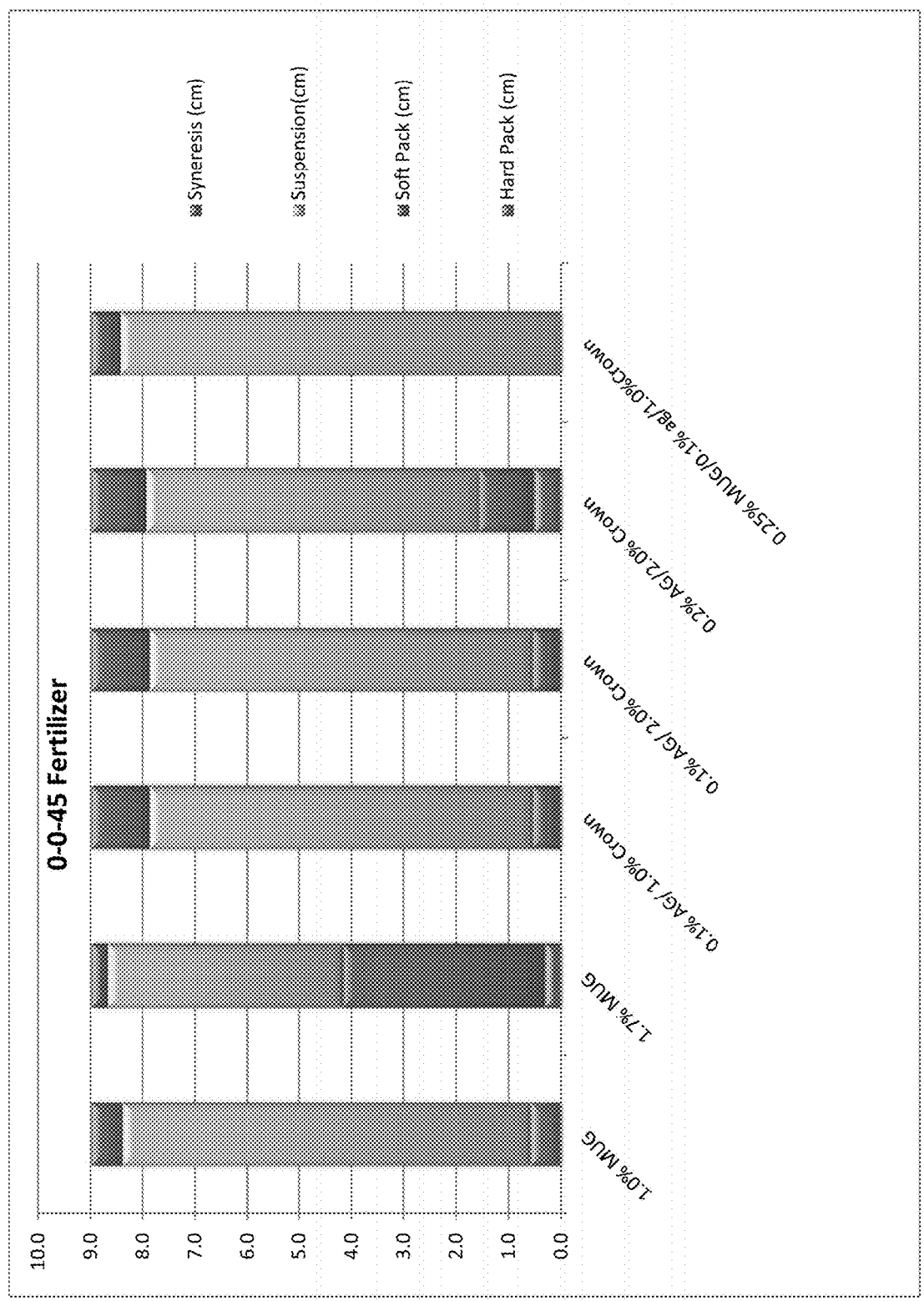
Figure 1C:
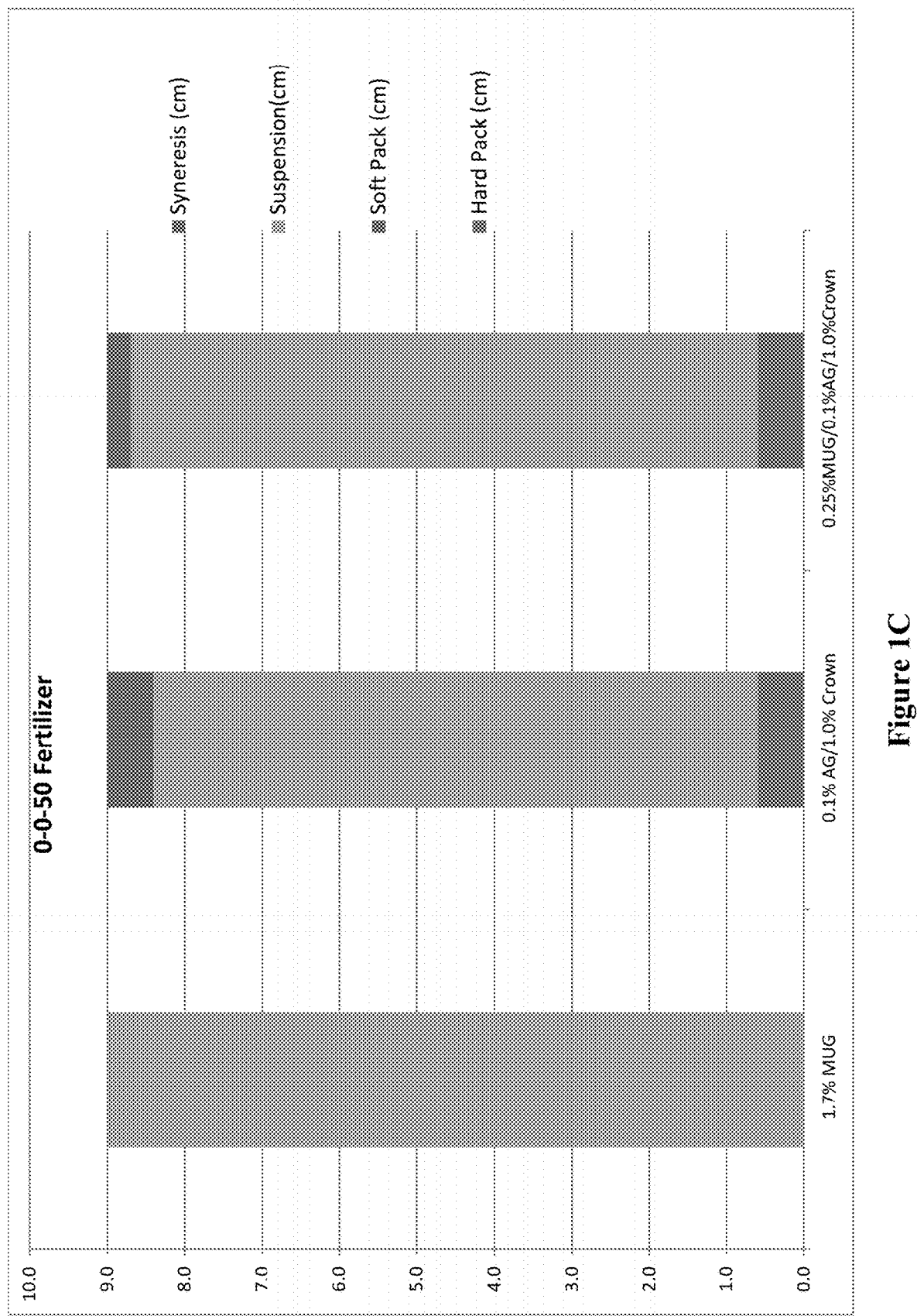

The results are shown in FIG. 1A for the fertilizers having a grade of 0-0-30, FIG. 1B for the fertilizers having a grade of 0-0-45, and FIG. 1C for the fertilizers having a grade of 0-0-50. The data for these experiments are shown in Table 2.

TABLE 2

Suspension Characteristics and Yield Stress Data for FIGS. 1A-C and Examples 1-14

| Example | Hard Pack (cm) | Soft Pack (cm) | Suspension (cm) | Syneresis (cm) | Yield Stress (Pa) |
|---|---|---|---|---|---|
| 1 | 0.0 | 0.0 | 9.0 | 0.0 | 6 |
| 2 | 1.0 | 0.0 | 2.5 | 5.5 | 208 |
| 3 | 1.5 | 0.0 | 2.0 | 5.5 | 186 |
| 4 | 1.5 | 0.0 | 4.0 | 3.5 | 478 |
| 5 | 0.0 | 0.5 | 5.5 | 3.0 | 447 |
| 6 | 0.3 | 3.9 | 4.5 | 0.3 | 486 |
| 7 | 0.6 | 0.0 | 7.8 | 0.6 | 1151 |
| 8 | 0.0 | 0.6 | 7.3 | 1.1 | 285 |
| 9 | 0.0 | 0.6 | 7.3 | 1.1 | 326 |
| 10 | 0.5 | 1.1 | 6.4 | 1.1 | 437 |
| 11 | 0.0 | 0.0 | 8.4 | 0.6 | 72 |
| 12 | 0.0 | 0.0 | 9.0 | 0.0 | NA |
| 13 | 0.6 | 0.0 | 7.8 | 0.6 | 301 |
| 14 | 0.6 | 0.0 | 8.1 | 0.3 | 367 |

The total suspension height in the graduated cylinder was 9.0 cm.

FIG. 1A shows that Example 1 (1.7% MUG) forms a stable suspension. There is no detected syneresis, soft packing, or hard packing. Example 2 differs from Example 1 in that ActiGel 208® is substituted for MIN-U-GEL®. Example 2 had some hard packing, no soft packing, a significant amount of syneresis, and a small amount of suspension. Example 3 differs from Example 2 by removing TSPP. In Example 2, the hard packing increased slightly, and no soft packing was measured. The amount of suspension decreased slightly compared with Example 3, and the amount of syneresis remained the same.

In Example 4, compared to Example 3, the amount of ActiGel 208® was doubled and kaolin was added. In Example 4, the amount of hard packing remained the same, no soft packing was observed, the amount of suspension nearly doubled, and the amount of syneresis decreased. In Example 5, compared to Example 4, the amount of crown doubled. In Example 5, compared to Example 4, the hard packing was not measured, but some soft packing was. The amount of suspension increased. The amount of syneresis decreased. The Crown and ActiGel 208® had a positive effect on the formulation, subtracting the suspension agent, equivalent of amounts of nutrients.

FIG. 1B shows the examples for fertilizers having a grade of 0-0-45. Example 6 shows a 1% MIN-U-GEL® formulation. Notice there is a detectable but small amount of syneresis and hard packing. Example 7, compared with Example 6, has an increased weight % of MIN-U-GEL®. Notice there is still syneresis and hard packing, but soft packing is also detected. Example 7 could be compared with Example 1, noting that the amount of potassium is higher in Example 7 than in Example 1. The same weight percentage of MIN-U-GEL® that formed a stable suspension in Example 1 was not capable of forming an analogous quality suspension in a fertilizer having 0-0-45 grade.

In Example 8, kaolin is present. The hard packing of Example 8 was not detected. Some soft packing was detected. The amount of suspension was increased, and the amount of syneresis was decreased. In Example 9, note the amount of kaolin. Example 9 has a decreased hard packing and soft packing. The suspension amount was increased, and the amount of syneresis was slightly increased. Example 10 differs from Example 9 in that the amount of ActiGel 208® was doubled. Example 10, compared to Example 9, had an increased hard packing and soft packing. The amount of suspension was decreased. The amount of syneresis remained the same. Example 11 differs from Example 9 in that MIN-U-GEL® and TSPP were added. In Example 11, neither hard packing nor soft packing was detected. The suspension amount was increased. The amount of syneresis was smaller.

In Examples 6-11, Example 11 showed the ability to achieve a very high solids percentage. Referring to Table 1, 75.51% solids were added to this example. In general, the formulations having a 0-0-45 grade were capable of forming a suspension having over 74% solids. And unlike the suspension of Example 1, where 1.7% of the formulation is MIN-U-GEL®, only 1.35% of the formulation of Example 11 is the suspension agent, which leaves more room for other solids, such as potassium, to be suspended.

FIG. 1C shows formulations having a grade of 0-0 50. Example 12 showed that the 1.7% MIN-U-GEL® formulation would not pour, as this formulation was a paste. Example 13, compared with Example 12, MIN-U-GEL® and TSPP were substituted with ActiGel 208® and kaolin. Example 13, compared with Example 12, was pourable but thick. Example 13 had some syneresis.

Example 14, compared with Example 13, added MIN-U-GEL® and TSPP. Example 14, compared with Example 13, had more suspension and less syneresis. The solids content of these examples exceeded 82%.

Figure 2A:
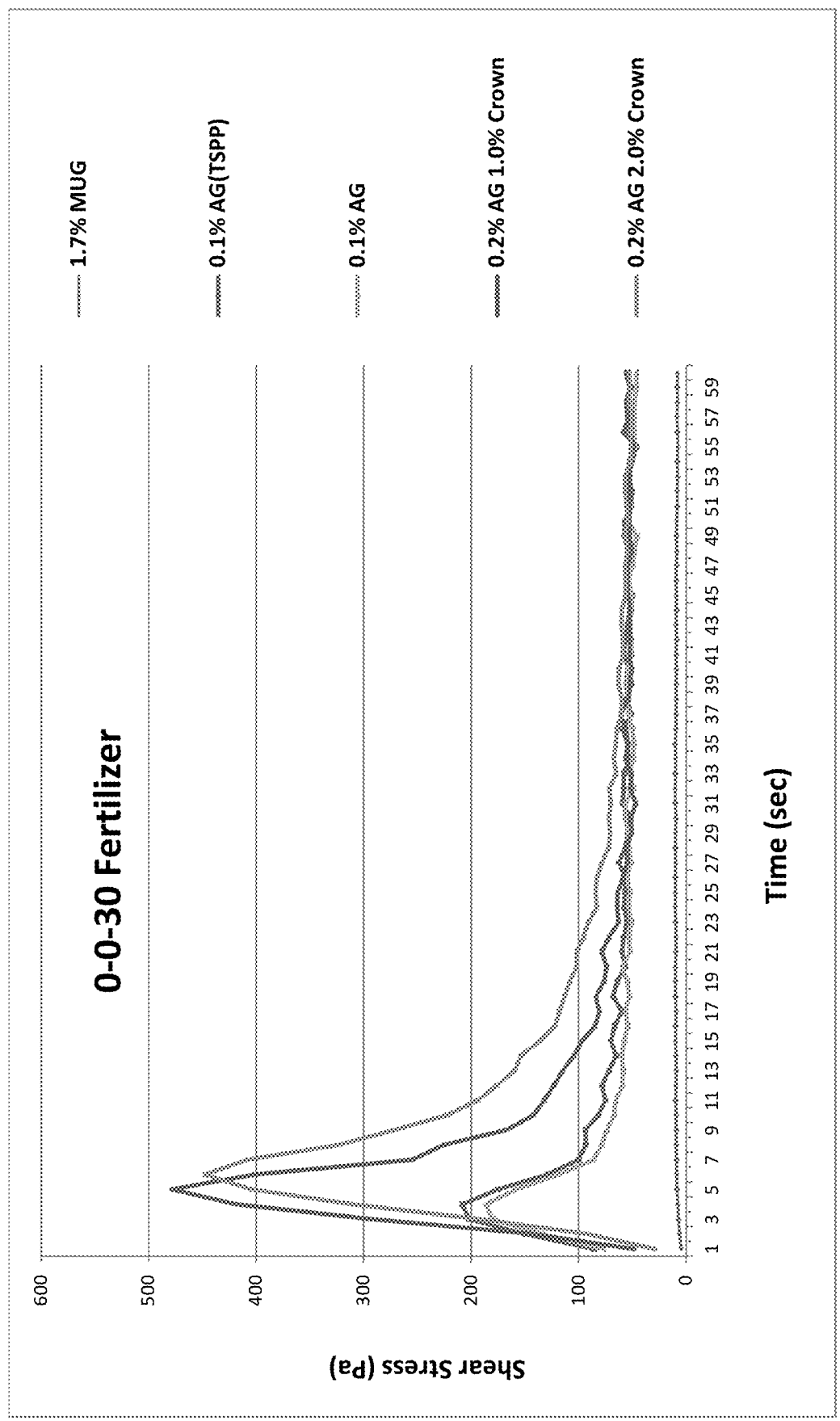
Figure 2B:
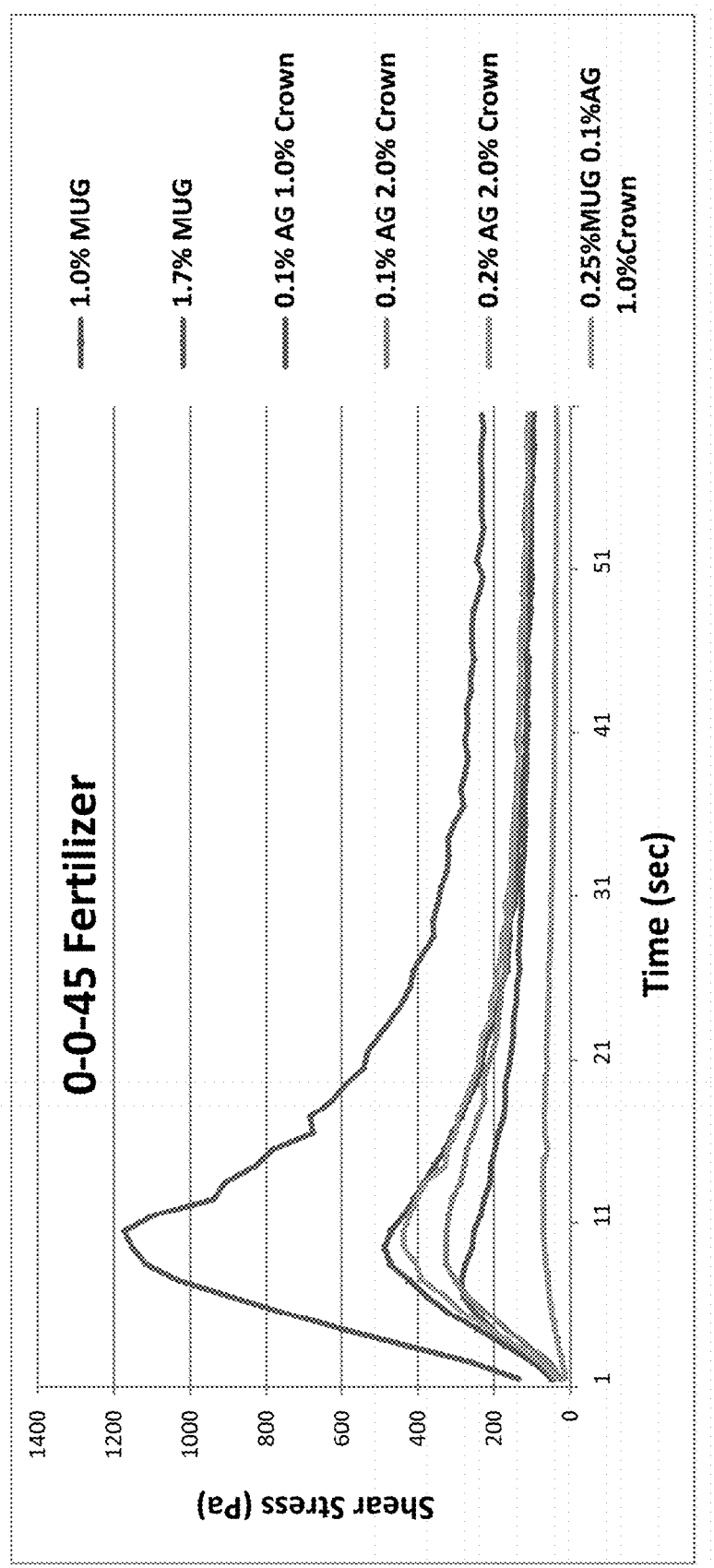
Figure 2C:
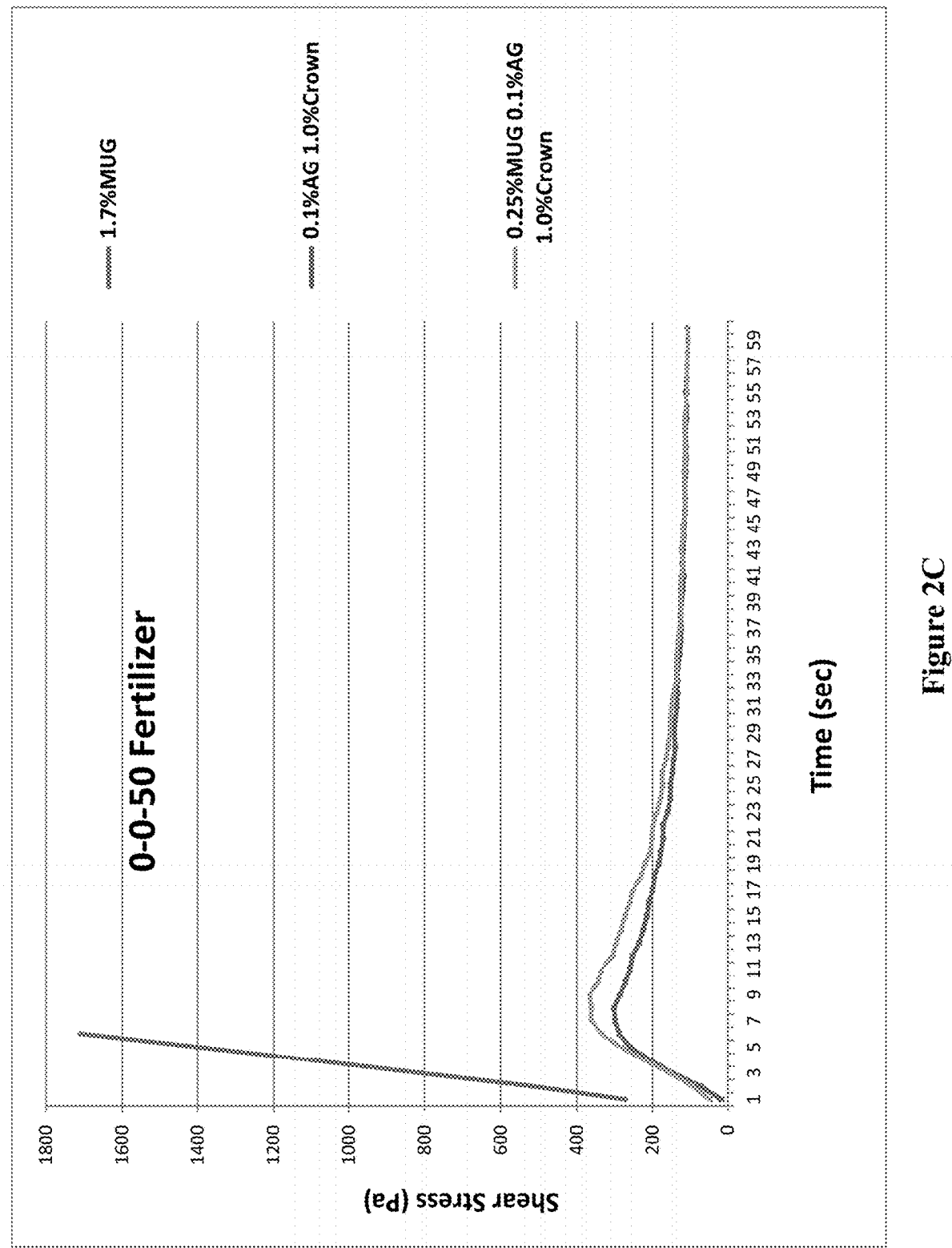
Figure 3:
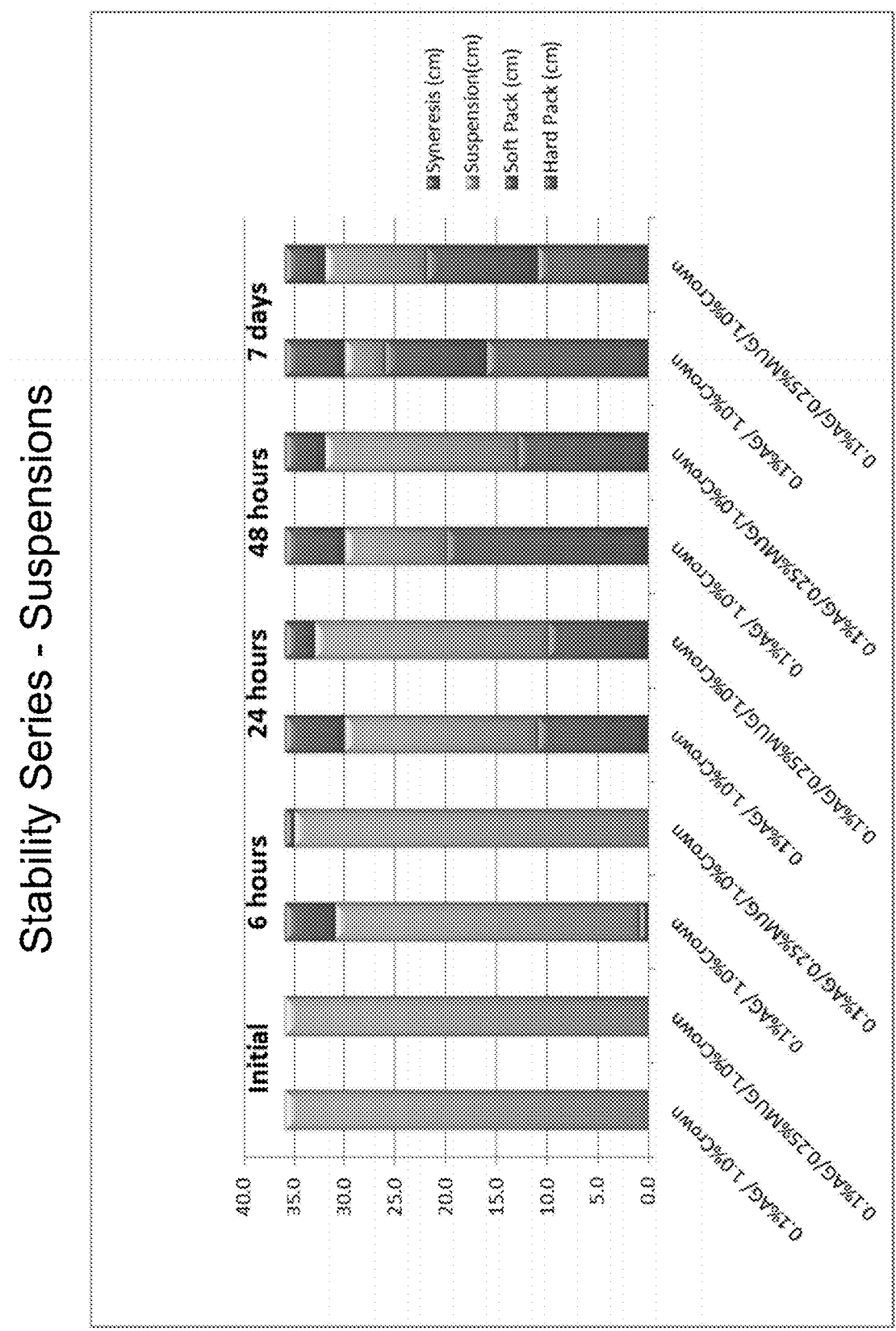
FIG. 3 is a bar chart of a stability series over seven days for two formulations.

For Examples 1-14, the yield stress was determined using an RS Plus Brookfield Rheology Unit having a 40-20 van spindle. The results are shown in Table 2. The shear stress (Pa) versus time(s) plots are shown in FIGS. 2A-C.

In Table 2, the total suspension height in the graduated cylinder was 9.0 cm. The term "Hard Pack (cm)" is the height in centimeters of the hard packing as measured by a lightweight rod that could not traverse the packed solids with force above gravity. The term "Soft Pack (cm)" is the height in centimeters of the soft packing as measured by a rod which was incapable of traversing the packed solid with the force of gravity. The term "Suspension (cm)" refers to the height of the suspension in centimeters. The term "Syneresis (cm)" refers to the height in centimeters of the bleed water near the top of the formulation.

For the formulations having 0-0-30 grade, the 1.7% MIN-U-GEL® formulation of Example 1 had the lowest yield stress, i.e., 9 Pa. Examples 2-5 had a yield stress of 208, 186, 478, or 447 Pa, respectively. These data are derivable from FIG. 2A. Although Examples 4-5 have higher yield stress, they have acceptable pourability and hard packing.

For formulations having 0-0-45 grade, Examples 6-11 had a yield stress of 486, 1151, 285, 326, 437, and 72 Pa, respectively. These data are derivable from FIG. 2B.

For formulations having 0-0-50 grade, Example 12 would not pour and had no measured yield stress. Examples 13-14 had a yield stress of 301 or 367 Pa, respectively. These data are derivable from FIG. 2C.

Example 2

Examples 17-20 were made in an analogous fashion to those used to make Examples 1-14. The ingredients for Examples 15-18 are in Table 3 along with the relative amounts of the ingredients. The potash source is CLU-NETTE. Experiments were performed to determine the yield stress on these formulations in a manner described above for Examples 1-14. The meaning of the terms in the first row of Table 1 is inferable from Tables 1-2.

Example 15 differed from Example 16 in that Example 16 had twice the amount of MIN-U-GEL® which only marginally increased the yield stress from 273 Pa to 282 Pa, respectively, and with no additional increase in KCl solids suspended. Example 17 compared with Example 15 differed in that Example 17 had a smaller amount of ActiGel 208® which resulted in a reduction in yield stress from 271 Pa to 167 Pa with no loss in KCl solids carrying capacity. Example 18, compared with Example 15, differed in that Example 18 had double the amount of kaolin. The yield stress of Example 18 was 128 Pa.

TABLE 3

| | Shorthand | 20% AG Slurry | 28% MUG Slurry | Neat Crown | Neat Potash (KCl) | Water | AG as % Solids | MUG as % total formula | Crown as % total formula | KCl Solids (w/w %) | K₂O based on 99% KCl | Total Solids added (w/w %) | Total Solids added (v/v %) | Yield Stress (Pa) |
|---|---|---|---|---|---|---|---|---|---|---|---|---|---|---|
| 15 | 0.1% AG/ 0.25% MUG/ 1.0% Crown | 2.4 | 6.0 | 6.7 | 488 | 164 | 0.10% | 0.3% | 1.0% | 73.2% | 45.4% | 74.51% | 60.9% | 273 |

TABLE 3-continued

Formulations of 0-0-45 Grade

| | Shorthand | 20% AG Slurry | 28% MUG Slurry | Neat Crown | Neat Potash (KCl) | Water | AG as % Solids | MUG as % total formula | Crown as % total formula | KCl Solids (w/w %) | $K_2O$ based on 99% KCl | Total Solids added (w/w %) | Total Solids added (v/v %) | Yield Stress (Pa) |
|---|---|---|---|---|---|---|---|---|---|---|---|---|---|---|
| 16 | 0.1% AG/ 0.5% MUG/ 1.0% Crown | 2.4 | 12.0 | 6.7 | 488 | 158 | 0.10% | 0.5% | 1.0% | 73.2% | 45.4% | 74.77% | 61.8% | 283 |
| 17 | 0.075% AG/ 0.25% MUG/ 1.0% Crown | 1.8 | 6.0 | 6.7 | 488 | 164 | 0.07% | 0.3% | 1.0% | 73.2% | 45.4% | 74.55% | 60.9% | 167 |
| 18 | 0.1% AG/ 0.25% MUG/ 2.0% Crown | 2.4 | 6.0 | 13.2 | 488 | 157 | 0.10% | 0.3% | 2.0% | 73.2% | 45.4% | 75.54% | 62.1% | 128 |

The potash source is CLUNETTE. AG is ActiGel 208 ®. MUG is MIN-U-GEL ®.

Each formulation exhibited pouring ability for the full column of suspended material with very slight syneresis and minimal hardpacking.

Example 3

Examples 19-22 were made in an analogous fashion to those used to make Examples 1-14. The ingredients for Examples 19-22 are in Table 4 along with the relative amounts of ingredients. The source of potash varied as shown in Table 4. The meaning of the terms in the first row of Table 1 is inferable from Tables 1-2.

For Example 19, the source of potash was CLUNETTE. For Example 20, the source of potash was OUACHITA. For Example 21, the source of potash was SOUTHERN STATES. For Example 22, the source of potash was CLUNETTE, but there was not a pre-mixing suspension made from ActiGel 208®, and MIN-U-GEL® as was used in the preparation of the earlier examples.

Experiments were performed to determine the yield stress on these formulations in a manner described for Examples 1-14. For example 19-22, the yield stress was measured to be 60, 126, 132, or 71 Pa, respectively. The yield stress for Example 19 was 60 Pa. The yield stress for Example 20 was 126 Pa. The yield stress for Example 21 was 132 Pa. The yield stress for Example 22 was 71 Pa. The source of potash did not affect the ability to make the suspension having reasonable yield stresses sufficient to allow flexible mixing. Furthermore, inferable from Example 22, there was no need to pre-mix the suspension agent before adding either form of attapulgite to the formulation. This is important because the method of making a simplified.

In general, yield stresses between 100-125 Pa result in good pourability, and yield stresses below 200 Pa have minimal hard packing.

Example 4

Two formulations having the 0-0-45 grade were measured to determine stability over time up to 7 days. These formulations were made in a manner similar to those described for Example 8 or 11 above. The first formulation, Example 23,

TABLE 4

Varying Potash Sources and a Dry-Mix Formulation

| | Shorthand | 20% AG Slurry | 28% MUG Slurry | Neat Crown | Neat Potash (KCl) | Water | Potash Source | AG as % Solids | MUG as % total formula | Crown as % total formula | KCl Solids (w/w %) | $K_2O$ based on 99% KCl | Total Solids added (w/w %) | Total Solids added (v/v %) | Yield Stress (Pa) |
|---|---|---|---|---|---|---|---|---|---|---|---|---|---|---|---|
| 19 | 0.1% AG/0.25% MUG/1.0% Crown | 2.4 | 6.0 | 6.7 | 488 | 164 | CLUNETTE | 0.10% | 0.3% | 1.0% | 73.2% | 45.4% | 74.51% | 60.9% | 60 |
| 20 | 0.1% AG/0.25% MUG/1.0% Crown | 2.4 | 6.0 | 6.7 | 488 | 164 | OUACHITA | 0.10% | 0.3% | 1.0% | 73.2% | 45.4% | 74.51% | 60.9% | 126 |
| 21 | 0.1% AG/0.25% MUG/1.0% Crown | 2.4 | 6.0 | 6.7 | 488 | 164 | SOUTHERN STATES | 0.10% | 0.3% | 1.0% | 73.2% | 45.4% | 74.51% | 60.9% | 132 |
| 22 | 0.1% AG/0.25% MUG/1.0% Crown | 0.5 | 1.7 | 6.7 | 488 | 170 | CLUNETTE Acti-Gel 208 ® and MIN-U-GEL ® added dry | 0.02% | 0.1% | 1.0% | 73.2% | 45.4% | 74.27% | 59.9% | 71 | had 0.1 solids weight fraction (SWF %) of ActiGel 208® and 1.0 percent solids weight (w/w %) kaolin. The second formulation, Example 24, had 0.1 solids weight fraction (SWF %) of ActiGel 208® and 1.0 percent solids weight (w/w %) kaolin, but further had 0.25 percent solids weight (w/w %) MIN-U-GEL®. Suspensions were made and poured into a graduated cylinder. The formulations were tested to determine syneresis, suspension, soft packing and hard packing based on the fraction of the suspensions which were placed in a graduated cylinder. The results are shown in Table 5 and in FIGS. 4A-B. In Table 5, the term "Time" indicates the time period from making the formulation to the time of the measurements. The other terms in the first row have the same meaning as in Table 2.

TABLE 5

Suspension stability over time for examples 25-26

| Example | Shorthand | Time | Syneresis (cm) | Suspension (cm) | Soft Pack (cm) | Hard Pack (cm) |
|---|---|---|---|---|---|---|
| 23 | 0.1% AG/ 1.0% Crown | 0 | 0.0 | 36.0 | 0.0 | 0.0 |
| 24 | 0.1% AG/ 0.25% MUG/ 1.0% Crown | 0 | 0.0 | 36.0 | 0.0 | 0.0 |
| 23 | 0.1% AG/ 1.0% Crown | 6 hrs | 5.0 | 30.0 | 1.0 | 0.0 |
| 24 | 0.1% AG/ 0.25% MUG/ 1.0% Crown | 6 hrs | 1.0 | 35.0 | 0.0 | 0.0 |
| 23 | 0.1% AG/ 1.0% Crown | 24 hrs | 6.0 | 19.0 | 11.0 | 0.0 |
| 24 | 0.1% AG/ 0.25% MUG/ 1.0% Crown | 24 hrs | 3.0 | 23.0 | 10.0 | 0.0 |
| 23 | 0.1% AG/ 1.0% Crown | 48 hrs | 6.0 | 10.0 | 20.0 | 0.0 |
| 24 | 0.1% AG/ 0.25% MUG/ 1.0% Crown | 48 hrs | 4.0 | 19.0 | 13.0 | 0.0 |
| 23 | 0.1% AG/ 1.0% Crown | 7 days | 6.0 | 4.0 | 10.0 | 16.0 |
| 24 | 0.1% AG/ 0.25% MUG/ 1.0% Crown | 7 days | 4.0 | 10.0 | 11.0 | 11.0 |

At time zero, Examples 23-24 each had a low viscosity, were pourable, had no settling, and no residue post-pouring.

After six hours each Example 23-24 was pourable, had no settling, and no residue post-pouring.

After 24 hours, each Example 23-24 was pourable, exhibited some soft settling, had slight gloppiness, and left a slight residue following pouring.

After 48 hours each example 23-24 was pourable, exhibited some soft settling, exhibited a slight gloppiness, and left a slight residue following pouring.

After seven days, example 23 is not pourable. It exhibited no slump. Example 24 was pourable as glop.

These data show that the examples exhibit stability for up to one week. For at least three days, each composition maintained desirable rheology.

Other embodiments of the invention will be apparent to those of ordinary skill in the art from consideration of the specification and practice of the embodiments disclosed herein. It is intended that the specification and examples be considered as nonlimiting, with a true scope and spirit of the invention being indicated by the following claims.

What is claimed is:

1. A method of fertilizing a plant, comprising applying a composition to a plant, the composition, in the form of an aqueous suspension, comprising:
   at least one form of attapulgite present in a solid weight fraction (SWF) amount ranging from 0.065% to 0.30%;
   kaolin present in a percent solids by weight (w/w %) amount ranging from 0.80% to 2.80%;
   one or more main plant nutrients; and
   water;
   wherein the total percent solids by weight (w/w %) amount in the composition ranges from 45% to 90%; and
   wherein the aqueous suspension is from 45% to 90% by weight of solid particulates relative to the total weight of water plus the dry weight of the solid particulates (% w/w).

2. The method of claim 1, wherein the composition is soil applied to roots of a plant.

3. The method of claim 1, wherein the composition is spray applied to leaves of a plant.

4. The method of claim 1, wherein the composition further comprises at least one second form of attapulgite present in a percent solids by weight (w/w %) amount ranging from 0.13% to 0.37%.

5. The method of claim 4, wherein the at least one form of attapulgite is chosen from purified attapulgite; and
   wherein the at least one second form of attapulgite is chosen from dry processed attapulgite.

6. The method of claim 1, wherein the at least one form of attapulgite is present in an amount SWF ranging from 0.075% to 0.20%.

7. The method of claim 1, wherein the at least one form of attapulgite is chosen from purified atta pulgite substantially free of non-atta pulgite minerals.

8. The method of claim 1, wherein the composition is substantially free of a deflocculant.

9. The method of claim 1, wherein the composition comprises the one or more main plant nutrients and wherein the one or more main plant nutrients includes potassium.

10. The method of claim 1, wherein the composition comprises one or more main plant nutrients and wherein the composition is in the form of a fertilizer having a grade in which the amount of potash ($K_2O$) ranges from 20 to 50.

11. The method of claim 1, wherein the composition comprises one or more main plant nutrients and further comprises one or more secondary plant nutrients chosen from calcium, magnesium, and sulfur.

12. A method of feeding an animal, which comprises feeding a composition to the animal, the composition, in the form of an aqueous suspension, comprising:
   at least one form of attapulgite present in a solid weight fraction (SWF) amount ranging from 0.065% to 0.30%;
   kaolin present in a percent solids by weight (w/w %) amount ranging from 0.80% to 2.80%;
   one or more major animal mineral nutrient supplements; and
   water;
   wherein the total percent solids by weight (w/w %) amount in the composition ranges from 45% to 90%; and
   wherein the aqueous suspension is from 45% to 90% by weight of solid particulates relative to the total weight of water plus the dry weight of the solid particulates (% w/w).

13. The method of claim 1, wherein the at least one form of attapulgite is present in an amount SWF ranging from 0.075% to 0.20%.

14. The method of claim 1, wherein the at least one form of attapulgite is chosen from attapulgites impoverished in smectite.

15. The method of claim 1, wherein the at least one form of attapulgite is chosen from purified attapulgite and dry processed attapulgite.

16. The method of claim 1, wherein the kaolin is present in a percent solids by weight (w/w %) amount ranging from 0.90% to 2.10%.

17. The method of claim 1, wherein the total percent solids by weight (w/w %) amount in the composition ranges from 50% to 85%.

18. The method of claim 1, further comprising at least one second form of attapulgite present in a percent solids by weight (w/w %) amount ranging from 0.13% to 0.37%.

19. The method of claim 18, wherein the at least one form of attapulgite is chosen from purified attapulgite; and wherein the at least one second form of attapulgite is chosen from dry processed attapulgite.

20. The method of claim 12, wherein the at least one form of attapulgite is chosen from purified atta pulgite substantially free of non-atta pulgite minerals.

\* \* \* \* \*

UNITED STATES PATENT AND TRADEMARK OFFICE
CERTIFICATE OF CORRECTION

PATENT NO. : 10,683,242 B2  
APPLICATION NO. : 15/749278  
DATED : June 16, 2020  
INVENTOR(S) : Steven B. Feldman et al.

Page 1 of 1

It is certified that error appears in the above-identified patent and that said Letters Patent is hereby corrected as shown below:

On the Title Page

Please correct item (72) as shown below:
Replace "Jeffery Carr, Jr.," with --Jeffrey B. Carr,--.

Signed and Sealed this
Sixth Day of October, 2020

Andrei Iancu
*Director of the United States Patent and Trademark Office*